(12) United States Patent
Hui et al.

(10) Patent No.: US 9,119,130 B2
(45) Date of Patent: Aug. 25, 2015

(54) PROACTIVE LINK-ESTIMATION IN REACTIVE ROUTING NETWORKS

(75) Inventors: Jonathan W. Hui, Belmont, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 13/524,861

(22) Filed: Jun. 15, 2012

(65) Prior Publication Data

US 2013/0250945 A1 Sep. 26, 2013

Related U.S. Application Data

(60) Provisional application No. 61/614,703, filed on Mar. 23, 2012.

(51) Int. Cl.
| | | |
|---|---|---|
| H04L 12/28 | (2006.01) | |
| H04L 12/26 | (2006.01) | |
| H04W 40/02 | (2009.01) | |
| H04W 40/28 | (2009.01) | |
| H04W 40/20 | (2009.01) | |
| H04L 12/721 | (2013.01) | |
| H04L 12/715 | (2013.01) | |

(52) U.S. Cl.
CPC ............ *H04W 40/023* (2013.01); *H04W 40/28* (2013.01); *H04L 45/32* (2013.01); *H04L 45/46* (2013.01); *H04W 40/20* (2013.01)

(58) Field of Classification Search
USPC .................. 370/389, 221, 252, 335, 342, 392
See application file for complete search history.

(56) References Cited

U.S. PATENT DOCUMENTS

| | | | |
|---|---|---|---|
| 6,132,306 A | 10/2000 | Trompower | |
| 6,633,544 B1 * | 10/2003 | Rexford et al. | ............... 370/238 |
| 6,732,163 B1 | 5/2004 | Halasz | |

(Continued)

FOREIGN PATENT DOCUMENTS

| | | |
|---|---|---|
| EP | 2548342 A1 | 1/2013 |
| WO | WO-2011115679 A1 | 9/2011 |

OTHER PUBLICATIONS

Finnie, et al., "Notification of Transmittal of the International Search Report and the Written Opinion of the International Searching Authority, or the Declaration", Patent Cooperation Treaty, International Appl. No. PCT/US2013/033470, mailed Jun. 25, 2013, 12 pages, European Patent Office, Rijswijk, Netherlands.

(Continued)

*Primary Examiner* — Edan Orgad
*Assistant Examiner* — Sithu Ko
(74) *Attorney, Agent, or Firm* — Parker Ibrahim & Berg LLC; James M. Behmke; Stephen D. LeBarron

(57) ABSTRACT

In one embodiment, a node in a computer network may receive one or more reactive routing route requests (RREQs) originated by an originating node, and may then identify one or more links that provide routes to the originating node based on the RREQs. The node may then determine one or more particular links within the one or more links for which to perform proactive link-estimation, and then perform proactive link-estimation on the one or more particular links. Optionally, the node may also maintain a number of the particular links that were subject to proactive link-estimation for a period of time.

18 Claims, 9 Drawing Sheets

(56) References Cited

U.S. PATENT DOCUMENTS

| | | | |
|---|---|---|---|
| 6,763,014 B2* | 7/2004 | Kennedy | 370/338 |
| 6,961,323 B1 | 11/2005 | Xu et al. | |
| 7,177,295 B1 | 2/2007 | Sholander et al. | |
| 7,385,988 B2 | 6/2008 | Asati | |
| 7,398,310 B1 | 7/2008 | Kuehl et al. | |
| 7,424,268 B2 | 9/2008 | Diener et al. | |
| 7,515,542 B2 | 4/2009 | Hertoghs et al. | |
| 7,542,414 B1 | 6/2009 | Katukam | |
| 7,606,335 B2 | 10/2009 | Kloper et al. | |
| 7,634,536 B2 | 12/2009 | Halasz | |
| 7,684,411 B2 | 3/2010 | Asati | |
| 7,729,290 B2 | 6/2010 | Saleh et al. | |
| 7,787,361 B2 | 8/2010 | Rahman et al. | |
| 7,826,454 B2 | 11/2010 | Polk et al. | |
| 7,826,463 B2 | 11/2010 | Patel et al. | |
| 7,826,560 B2 | 11/2010 | Raleigh et al. | |
| 7,840,217 B2 | 11/2010 | Patel et al. | |
| 7,848,224 B2 | 12/2010 | Bryant et al. | |
| 7,869,350 B1 | 1/2011 | Bryant et al. | |
| 7,899,027 B2 | 3/2011 | Castagnoli et al. | |
| 7,965,642 B2 | 6/2011 | Shand et al. | |
| 7,978,725 B2 | 7/2011 | Gong et al. | |
| 7,983,174 B1 | 7/2011 | Monaghan et al. | |
| 8,036,224 B2* | 10/2011 | Axelsson et al. | 370/395.21 |
| 8,068,411 B2 | 11/2011 | Vasseur et al. | |
| 8,068,840 B2 | 11/2011 | Patel et al. | |
| 8,125,911 B2 | 2/2012 | Patel et al. | |
| 8,179,801 B2 | 5/2012 | Previdi et al. | |
| 8,308,509 B2 | 11/2012 | Karam | |
| 8,363,662 B2 | 1/2013 | Thubert et al. | |
| 8,374,092 B2 | 2/2013 | Previdi et al. | |
| 8,374,164 B2 | 2/2013 | Nadeau et al. | |
| 8,392,541 B2 | 3/2013 | Agarwal et al. | |
| 2003/0204623 A1 | 10/2003 | Cain | |
| 2006/0072602 A1 | 4/2006 | Achanta | |
| 2006/0215583 A1 | 9/2006 | Castagnoli | |
| 2007/0206547 A1 | 9/2007 | Gong et al. | |
| 2009/0175172 A1* | 7/2009 | Prytz et al. | 370/238 |
| 2011/0228696 A1 | 9/2011 | Agarwal et al. | |
| 2011/0231573 A1 | 9/2011 | Vasseur et al. | |

OTHER PUBLICATIONS

Haas, et al., "The Zone Routing Protocol (ZRP) for Ad Hoc Networks", Internet Draft, draft-ietf-manet-zone-zrp-03.txt, Mar. 2000, 48 pages, The Internet Engineering Task Force Trust.

Kum, et al., "An Efficient On-Demand Routing Approach with Directional Flooding for Wireless Mesh Networks", Journal of Communications and Networks, vol. 12, No. 1, Feb. 2010, pp. 67-73, Seoul, Korea.

Li, et al., "ABRP: Anchor-Based Routing Protocol for Mobile Ad Hoc Networks", Wireless Personal Communications, vol. 42, No. 2, Aug. 16, 2006, pp. 277-300, Kluwer Academic Publishers.

Ochi, et al., "An Extended AODV Routing for Reduction of Control Messages in Ad Hoc Networks", Consumer Communications and Networking Conference, Jan. 2007, 5 pages, Institute of Electrical and Electronics Engineers.

Pozzi, et al., "Notification of Transmittal of the International Search Report and the Written Opinion of the International Searching Authority, or the Declaration", Patent Cooperation Treaty, International Appl. No. PCT/US2013/033478, mailed Jun. 26, 2013, 12 pages, European Patent Office, Rijswijk, Netherlands.

Singh, et al., "Enhanced AODV Routing Protocol with paging in Heterogeneous IP-Based Networks", Wireless Communications and Networking Conference, Apr. 18, 2010, 6 pages, Institute of Electrical and Electronics Engineers, Piscataway, NJ.

Sucec, et al., "A Query Scope Agent for Flood Search Routing Protocols", Wireless Networks, The Journal of Mobile Communication, vol. 9, No. 6, Nov. 2003, pp. 623-636, Kluwer Academic Publishers, The Netherlands.

Clausen, et al., "The LLN On-demand Ad hoc Distance-vector Routing Protocol—Next Generation (LOADng)", IETF Trust, Network Working Group, Internet Draft, draft-clausen-lln-loadng-02, 44 pages.

Li, et al., "On-Demand Node-Disjoint Multipath Routing in Wireless Ad Hoc Networks", Proceedings of the 29th Annual IEEE International Conference on Local Computer Networks (LCN '04), Tampa, Florida, Nov. 2004, 2 pages.

Sambasivam, et al., "Dynamically Adaptive Multipath Routing Based on AODV", IEEE Communications Magazine 1, 205-217 (2002).

Sarma, et al., "A Multipath QoS Routing with Route Stability for Mobile Ad Hoc Networks", IETE Technical Review, vol. 27, No. 5, pp. 380-397, Sep. 2010.

Vasseur, et al., "Techniques for Use in Reactive Routing Networks", U.S. Appl. No. 61/614,703, filed Mar. 23, 2012, 64 pages.

Winter; et al., "RPL: IPv6 Routing Protocol for Low-Power and Lossy Networks", Internet Engineering Task Force, Request for Comments 6550, Mar. 2012, 158 pages.

Clausen, et al., "The LLN On-demand Ad hoc Distance-vector Routing Protocol—Next Generation (LOADng)", IETF Trust, Network Working Group, Internet Draft, draft-clausen-lln-loadng-04, Apr. 2012, 50 pages.

Clausen, et al., "The LLN On-demand Ad hoc Distance-vector Routing Protocol—Next Generation (LOADng)", IETF Trust, Network Working Group, Internet Draft, draft-clausen-lln-loadng-05, Jul. 2012, 57 pages.

Winter, et al., "RPL: IPv6 Routing Protocol for Low Power and Lossy Networks", draft-ietf-roll-rpl-19, IETF Internet-Draft; Mar. 2011, 164 pages.

* cited by examiner

PROACTIVE LINK-ESTIMATION IN REACTIVE ROUTING NETWORKS

RELATED APPLICATION

The present application claims priority to U.S. Provisional Patent Application Ser. No. 61/614,703, filed Mar. 23, 2012, entitled TECHNIQUES FOR USE IN REACTIVE ROUTING NETWORKS, by Vasseur, et al., the contents of which are hereby incorporated by reference.

TECHNICAL FIELD

The present disclosure relates generally to communication networks, and more particularly, to reactive routing in communication networks.

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. Routing in LLNs is undoubtedly one of the most critical challenges and a core component of the is overall networking solution. Two fundamentally and radically different approaches, each with certain advantages and drawbacks, have been envisioned for routing in LLN/ad-hoc networks and are known as:

1) Proactive routing: routing topologies are pre-computed by the control plane (e.g., IS-IS, OSPF, RIP, and RPL are proactive routing protocols); and 2) Reactive routing: routes are computed on-the-fly and on-demand by a node that sends discovery probes throughout the network (e.g., AODV, DYMO, and LOAD are reactive routing protocols), usually driven by user packets to be sent over the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
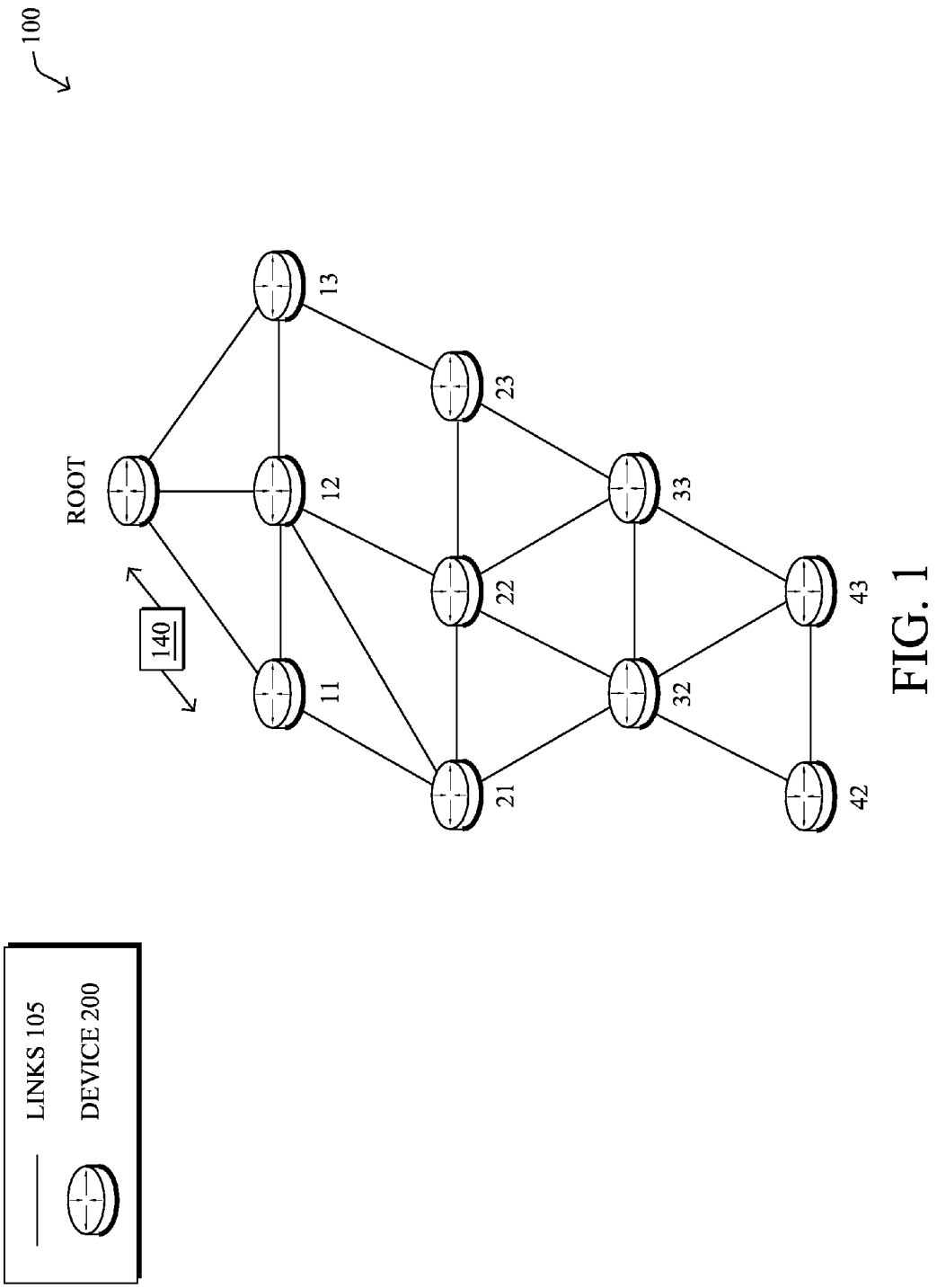
FIG. 1 illustrates an example communication network.

According to one or more embodiments of the disclosure, a node in a computer network may receive one or more reactive routing route requests (RREQs) originated by is an originating node, and may then identify one or more links that provide routes to the originating node based on the RREQs. The node may then determine one or more particular links within the one or more links for which to perform proactive link-estimation, and may then perform proactive link-estimation on the one or more particular links. Optionally, the node may also maintain a number of the particular links that were subject to proactive link-estimation for a period of time.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," ... "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
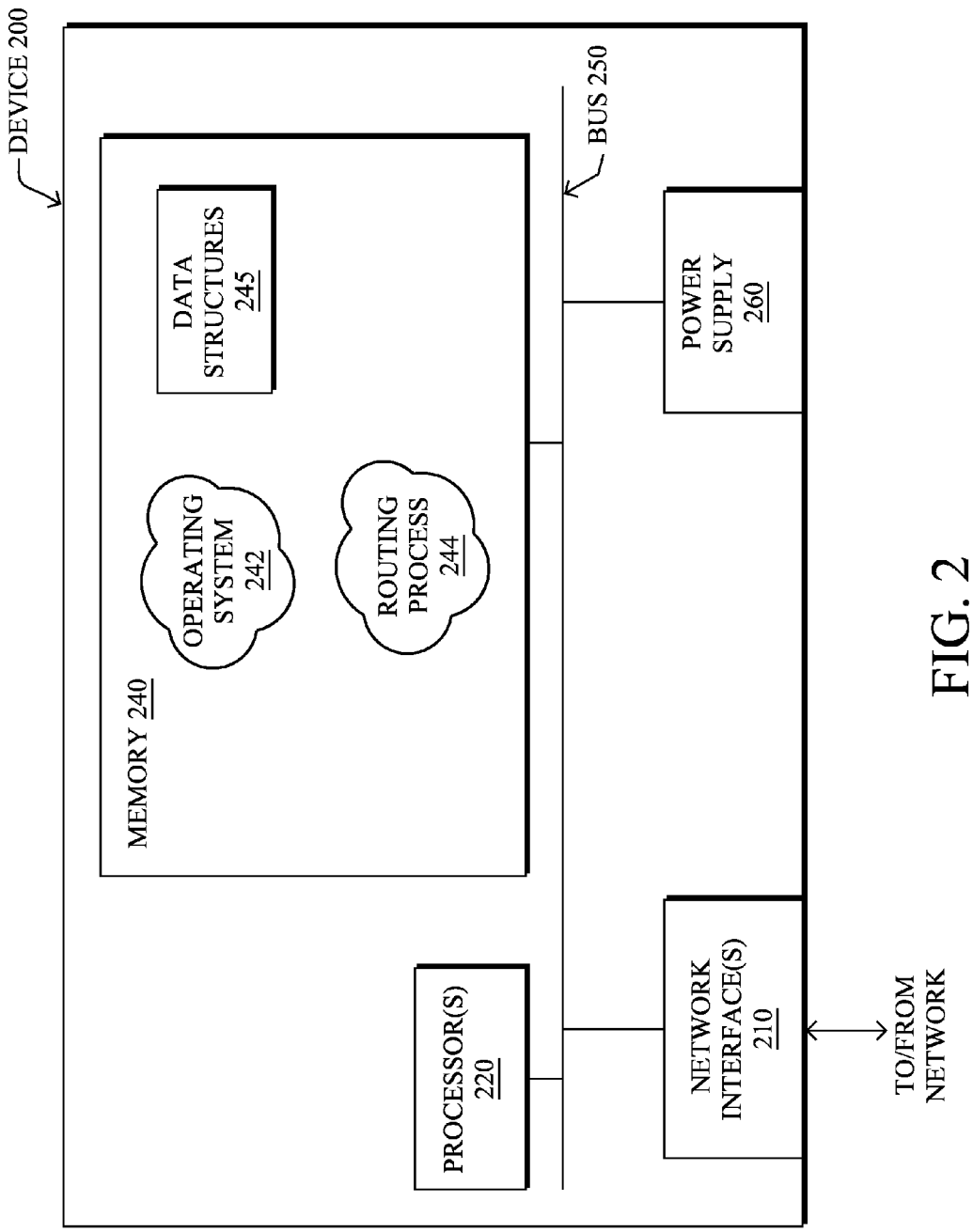
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing process 244, as described herein. Note that while the routing process 244 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which is are a class of networks in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

As noted above, routing in LLNs is undoubtedly one of the most critical challenges and a core component of the overall networking solution. Two fundamentally and radically different approaches have been envisioned for routing in LLN/ad-hoc networks known as proactive routing (routing topologies are pre-computed by the control plane) and reactive routing (routes are computed on-the-fly and on-demand by a node is that sends a discovery probes throughout the network).

An example proactive routing protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Directed Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

An example reactive routing protocol is specified in an IETF Internet Draft, entitled "LLN On-demand Ad hoc Distance-vector Routing Protocol—Next Generation (LOADng)" <draft-clausen-lln-loadng-02> by Clausen, et al. (Mar. 12, 2012 version), provides a reactive routing protocol for LLNs, e.g., as derived from AODV. Other reactive routing protocol efforts include the G3-PLC specification approved by the ITU, and also one described in an informative annex of IEEE P1901.2.

One stated benefit of reactive routing protocols is that their state and communication overhead scales with the number of active sources and destinations in the network. Such protocols only initiate control traffic and establish state when a route to a destination is unknown. In contrast, proactive routing protocols build and maintain routes to all destinations before data packets arrive and incur state and communication overhead that scales with the number of nodes, rather than the number of active sources and destinations. Some believe that reactive routing protocols are well-suited for certain Smart Grid Automated Meter Reading (AMR) applications where a Collection Engine is reads each meter one-by-one in round-robin fashion. In such simplistic applications, only one source-destination pair is required at any point in time for a given traffic flow.

Reactive routing protocols, however, have a number of technical issues that are particularly exhibited in large-scale LLNs, such as large utility networks. It is thus important to have a robust solution for reactive routing. Therefore, various techniques are hereinafter shown and described for use with reactive routing networks to address such shortcomings.

Selective Link Quality Estimation

As noted above, a unique property of LLN applications (e.g., Advanced Metering Infrastructure) is that traffic flows typically traverse the LLN Border Router (LBR). In particular, the vast majority of traffic within a LLN either flows from the LBR to a LLN device or from a LLN device to a LBR. RPL takes advantage of this property by building DODAGs in which the LBR serves as the root. By routing traffic upwards and downwards along the DODAG, the control and state costs grow linearly with the number of devices, rather than as a function of the square of the number of devices.

In contrast, existing reactive routing protocols provide shortest-path routes between any source-destination pair; consequently, existing reactive protocols do not take advantage of the fact that the vast majority of traffic flows on a LLN converge on a LBR. This deficiency is problematic because existing reactive routing protocols need to perform link quality estimation, which incurs significant overhead costs and also increases network latency. For example, existing reactive routing protocols generally operate by flooding a network with a Route Request (RREQ) message in order to solicit a Route Reply (RREP) from a destination. Devices processing the RREQ and RREP messages must utilize link quality estimates and knowledge of link bi-directionally to update their routing state and compute the routing costs that they include in the RREQ and RREP messages. Existing reactive routing protocols (e.g., AODV, DYMO, and LOAD) all require the use of link quality estimation to compute link metrics and determine the bi-directionality of a link.

Link quality estimation is an important process in LLNs, where it is used to is compute path costs and perform rate adaptation. For example, IEEE 802.15.4 g and IEEE P1901.2 both provide PHY layers that are capable of adjusting their bit rates by an order of magnitude or more. With IEEE P1901.2, performing link estimation is important for OFDM PHYs that support Tone Mapping: a process that selects and adjusts the gain of each subcarrier. Tone Mapping requires devices to send a unicast Tone Map Request (TMREQ) and receive a unicast Tone Map Response (TMREP).

A routing protocol implementation must decide whether to maintain link qualities proactively (e.g., using Neighborhood Discovery Protocol (NHDP)) or reactively (e.g., using Neighbor Discovery Protocol (NDP)). The proactive method allows lower latency in establishing a route since network devices do not have to build link quality estimates during the route discovery phase. Additionally, the proactive method allows devices to determine the link's quality over a long period of time, rather than from a single sample. However, without any knowledge of traffic flows, nodes must maintain link qualities with all their neighbors; consequently, control communication costs grow with the square of node density, which may be fairly high in certain network environments (thus causing issues with scaling). The reactive method allows devices to only determine link qualities for those links that may be used between an active source-destination pair, but determining the link quality during the route discovery phase can add significant latency to the process. This contrasts with proactive routing protocols in which routes are computed a priori.

The techniques herein allow a reactive routing protocol to provide greater information to the link quality estimation process through a method of proactive link-estimation, which reduces link quality estimation overhead and minimizes delay in the route-discovery phase. For instance, the techniques herein provide for a reactive routing protocol that indicates the set of neighbors on which to perform link quality estimation, thus allowing proactive link-estimation, while limiting the set of neighbors to which the proactive link-estimation applies, and the time period required for the proactive link-estimation to occur.

Specifically, according to one or more embodiments of the disclosure as described in detail below, the techniques herein allow a node in a computer network to receive one or more reactive routing route requests (RREQs) originated by an originating node, and then identify one or more links that provide routes to the originating node based on the RREQs. The node may then determine one or more particular links within the one or more links for which to perform proactive link-estimation, and may then perform proactive link-estimation on the one or more particular links. Optionally, the node may also maintain a number of the particular links that were subject to proactive link-estimation for a period of time.

The techniques herein allow reactive routing protocols to dynamically select a set of links on which to perform proactive link quality estimation, as well as a time duration over which the proactive link-estimation may occur. For example, the techniques herein may extend RREQ messages to include an illustrative proactive link-estimation (PLE) indicator/flag, which indicates whether devices should perform proactive link-estimation for links that may provide routes towards the RREQ's originator. In addition to the PLE indicator/flag, the RREQ may include the number of links each device should maintain and the time duration, both of which may be dynamically adjusted based on observed network conditions. This is in contrast to existing reactive routing approaches (e.g., AODV, DYMO, and LOAD), which require devices to perform proactive link-estimation with all neighbors or reactive link-estimation, which can be extremely costly.

Illustratively, the techniques described herein may be performed by hardware, software, and/or firmware, such as in accordance with the routing process 244, which may contain computer executable instructions executed by the processor 220 (or independent processor of interfaces 210) to perform functions relating to the novel techniques described herein. For example, the techniques herein may be treated as extensions to conventional routing protocols, such as the various reactive routing protocols, and as such, may be processed by similar components understood in the art that execute those protocols, accordingly.

Operationally, the techniques herein take advantage of the fact that in most LLN applications, the vast majority of traffic flows through the LBR (root node). In other words, the majority of flows within a LLN have one end-point at the LBR. This differs is from existing reactive routing protocols, such as AODV, DYMO, and LOAD, which are designed for arbitrary source-destination pairs within a network. Since existing routing protocols could not make any end-point assumptions about flows, proactive neighbor discovery protocols and link quality estimators required devices to maintain state about all of their 1-hop and, in some cases, 2-hop neighbors. This may result in communication and state costs that grow prohibitively large in the dense networks that are typical of large-scale LLNs. For example, in Smart Grid AMI networks, a typical device may have a few hundred neighbors, and in a dense smart city network the number of neighbors may be even larger.

Based on the understanding that the vast majority of traffic of certain LLN networks flows through the LBR, the techniques herein may optimize which links devices select to perform proactive link quality estimation (i.e., link selection), and also may determine how long such devices should perform proactive link quality estimation (i.e., time specification).

Link Selection

Existing protocols require link estimation protocols to either proactively maintain state for all neighbors or reactively establish state during the route discovery process. In contrast, link selection involves dynamically selecting links on which to perform proactive link quality estimation. Illustratively, the techniques herein define a new Proactive Link-Estimation (PLE) indicator/field/flag that may be included in routed messages. For example, when included in a RREQ message, the PLE indicator/field/flag indicates that the originator of the RREQ message is likely to be used again, and a device(s) that receives such a RREQ message should perform proactive link-estimation for links that are likely to be used when routing towards the originator. Devices that receive a RREQ message that includes the PLE flag begin to flag (e.g., make note of) links that provide routes towards the originator. In one embodiment, devices may select the first proactive link when receiving the first RREQ message. For any subsequent RREQ message, if the path cost is no greater than the path cost of the initial RREQ message, the device(s) may flag the new link as a proactive link. By filtering links based on path cost, the device(s) will only perform proactive link-estimation for links that are likely to provide routes towards the originator. In another embodiment, the requesting nodes may set the PLE flag based on additional criteria including, but not limited to: 1) historical data hosted on the node, 2) data provided by an NMS or LBR gathering traffic matrix information, which prevents the source node from having to store additional data, and/or 3) additional data based on a policy-map that uses the packet marking (DSCP) as an indicator of the fact that proactive link-estimation for that destination is important because the packet(s) sent to this destination is delay sensitive.

In dense network environments, or in network environments where device resources are highly constrained, devices may need to further limit the number of links that are used for proactive link-estimation. In one embodiment, devices may be manually configured to only select the number of links "X" that provide the X best path costs towards the originator. In another embodiment, the RREQ message may include the number of links a device should attempt to maintain.

In yet another embodiment, the number of links X a device maintains may be dynamically selected based on observed network conditions. For example, in cases where the originator receives more than "K" Route Error (RERR) messages in a given period of time, the originator may increase the number of links X. When K falls below a threshold, the originator may decrease the number of links X. In another embodiment, the determination of X may be done locally by each node based on observed link qualities to neighboring devices or other characteristics of a link (e.g., instabilities).

Time Specification

Time specification involves dynamically adjusting the time period for which a device should perform proactive link quality estimation. In one embodiment, devices may be manually configured to perform proactive link quality estimation for a period of time "T" after receiving a RREQ message that includes the PLE flag. In another embodiment, the RREQ message may include the time period T that devices should perform proactive link quality estimation after receiving the RREQ message.

In one embodiment, the time period T may be based on observed traffic flowing throw the LBR. For example, in Smart Grid AMI applications, particular hours of the day may be reserved for performing meter reads. During these periods, the time period T may be set such that devices always perform proactive link-estimation as a Collection Engine that interacts with each meter in round-robin fashion.

In one embodiment, the time period T may also be used by devices to locally determine the number of links X on which to perform proactive link-estimation. For example, with longer time periods T, devices may choose to select a larger value for X to help ensure that a path during the specified time period may be found quickly.

Figure 3A:
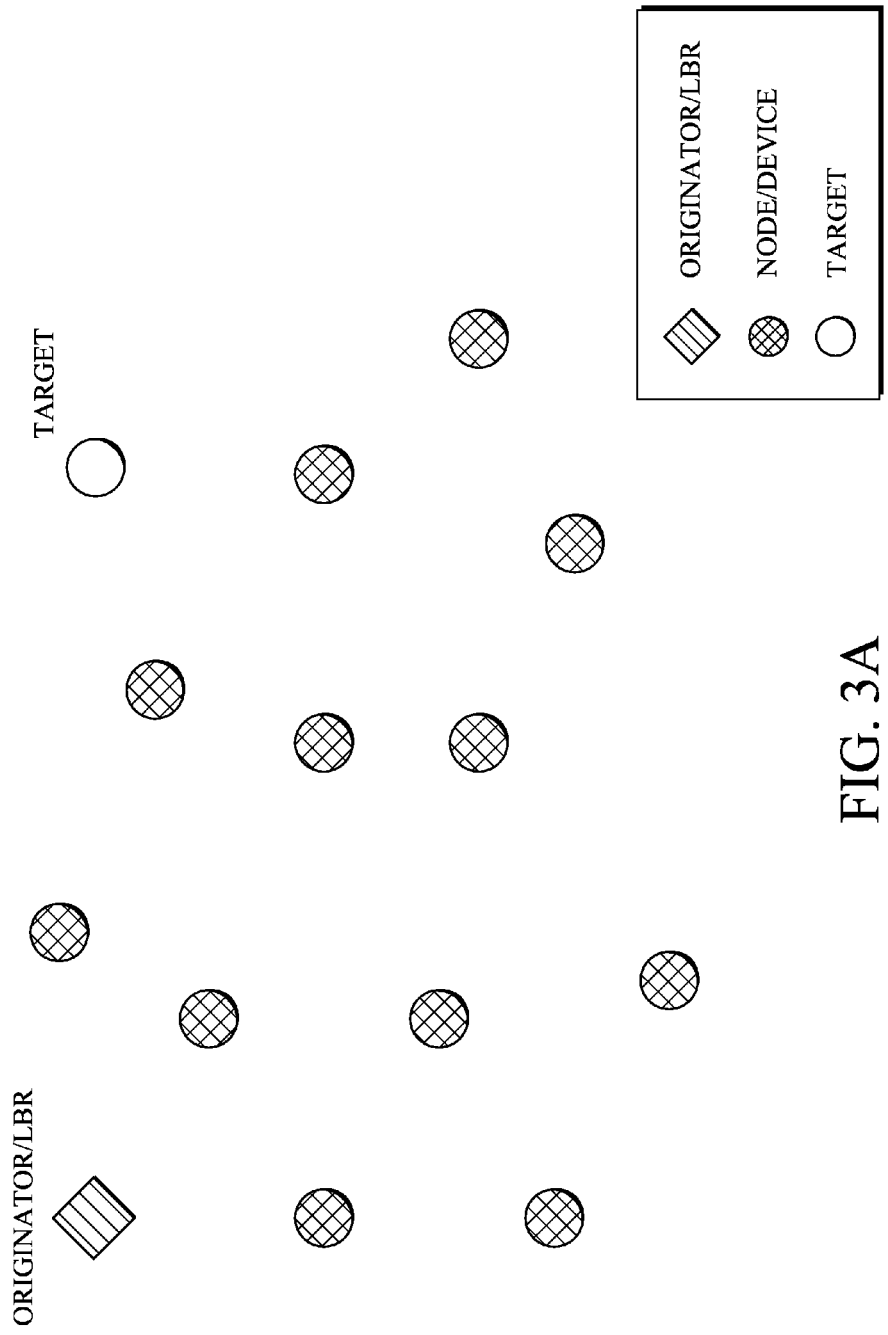
FIGS. 3A-3F illustrate an example of a reactive routing protocol with proactive link-estimation.

FIGS. 3A-3F illustrate an example of the techniques herein. In particular, as shown in FIG. 3A, the Originator also serves as the LBR for the LLN; consequently, it will likely serve as a route endpoint for the vast majority of flows through the LLN.

Figure 3B:
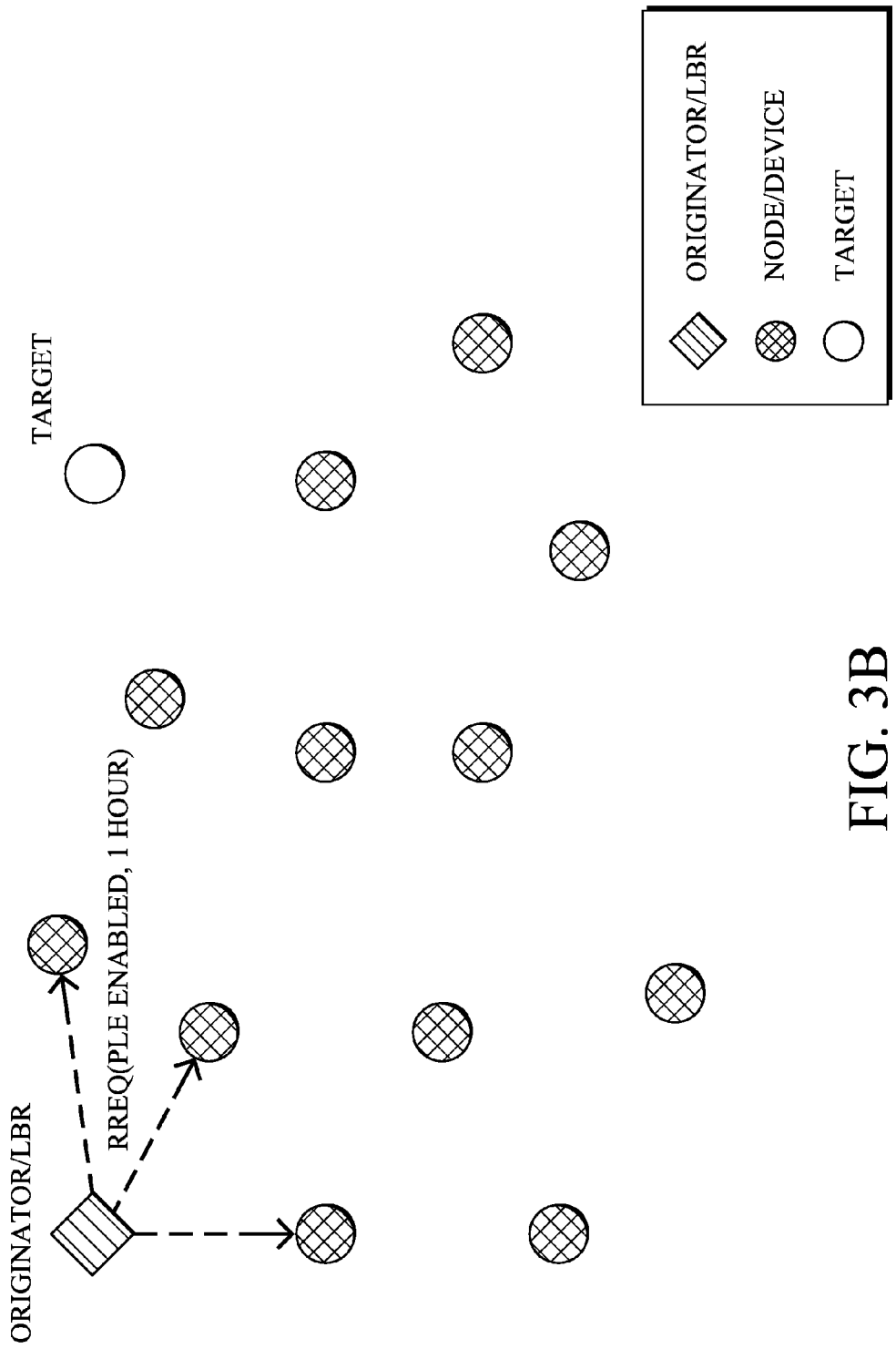

Illustratively, as shown in FIG. 3B, the Originator may set a Proactive Link-Estimation (PLE) flag when sending RREQ messages. Optionally, the Originator may also include a Time Specification in the RREQ (e.g., 1 hour) along with the PLE to specify some timing properties for the proactive link-estimation as described herein. For instance, the time specification may indicate how long to perform proactive link-estimation and/or over what period of time to probe the link.

Figure 3C:
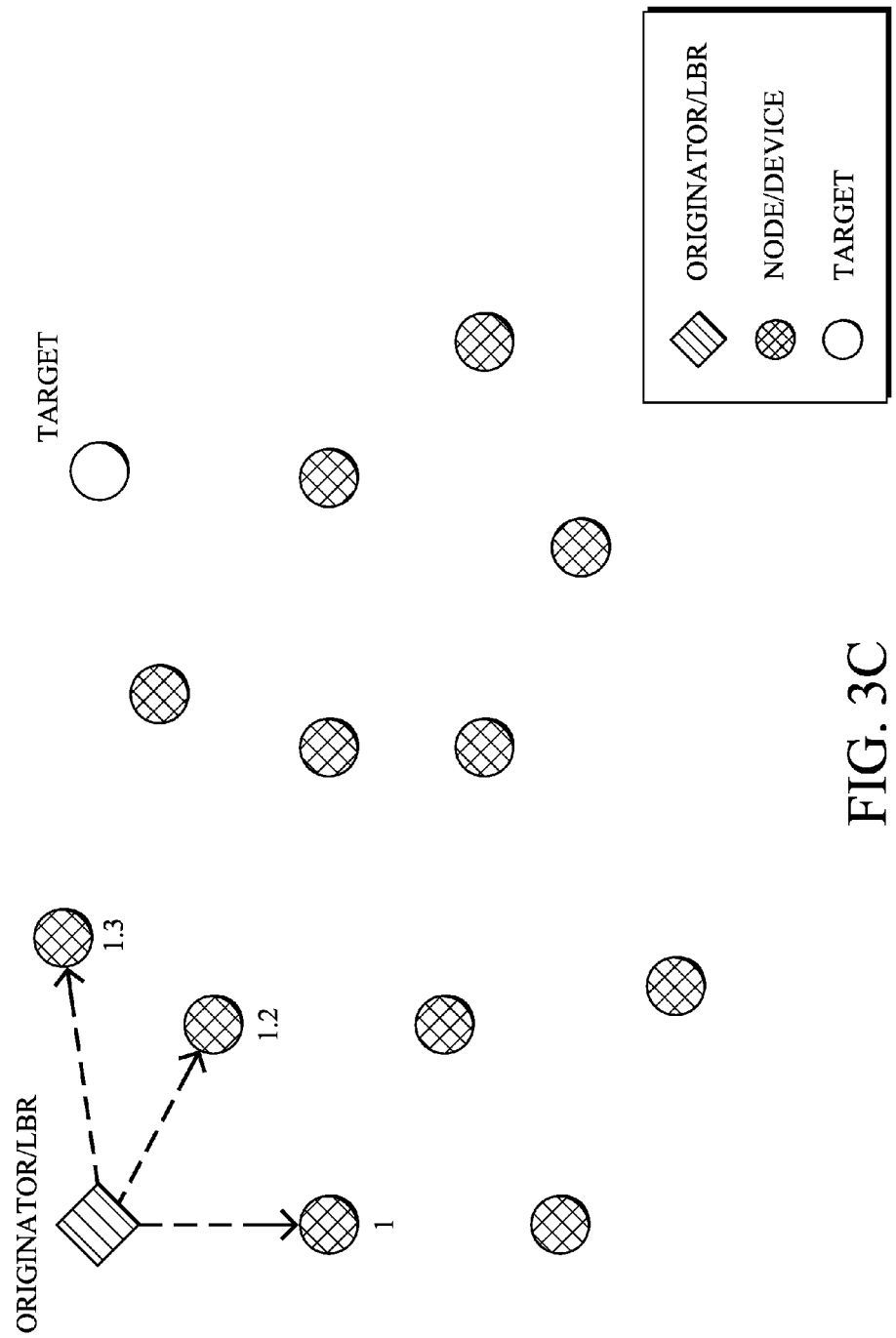

When receiving the first set of RREQ messages, as shown in FIG. 3C, the devices may perform link estimation in order to form a path cost. For example, with estimated (re-)transmission count ("ETX"), the devices may add the link ETX in order to form the new path cost. Example path ETX values are shown next to each device in FIG. 3C. Devices may delay re-broadcasting the RREQ until they have computed a link quality estimate (adding latency to the RREQ propagation). Nodes that receive RREQ messages in which the PLE flag is set dynamically may choose links to perform proactive link-estimation. Also, nodes may choose links to neighbors that are likely to provide satisfactory routes. In particular, devices may select links to neighbors that satisfy the loop-prevention logic of the RREQ message. Illustratively, devices may maintain proactive link neighbors with any device that has an ETX less than itself. Due to limited resource, devices may limit the number of links selected for proactive link-estimation.

Figure 3D:
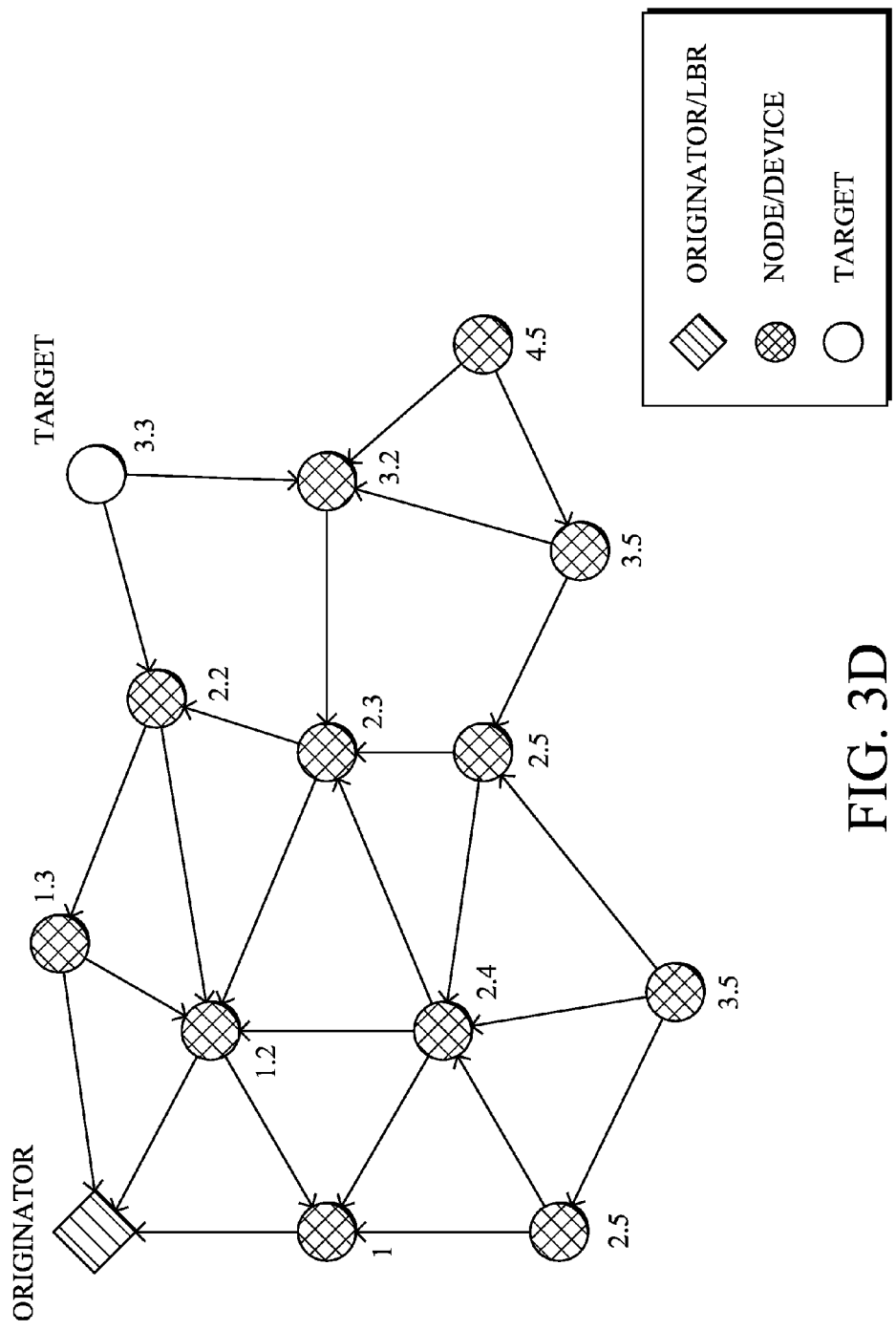

As shown in FIG. 3D, the process may continue hop-by-hop until the RREQ reaches all devices in the network. Since the RREQ is communicated using a flood, every device that receives a RREQ with the PLE flag set may select links to the Originator for which to proactively maintain link quality estimates.

Figure 3E:
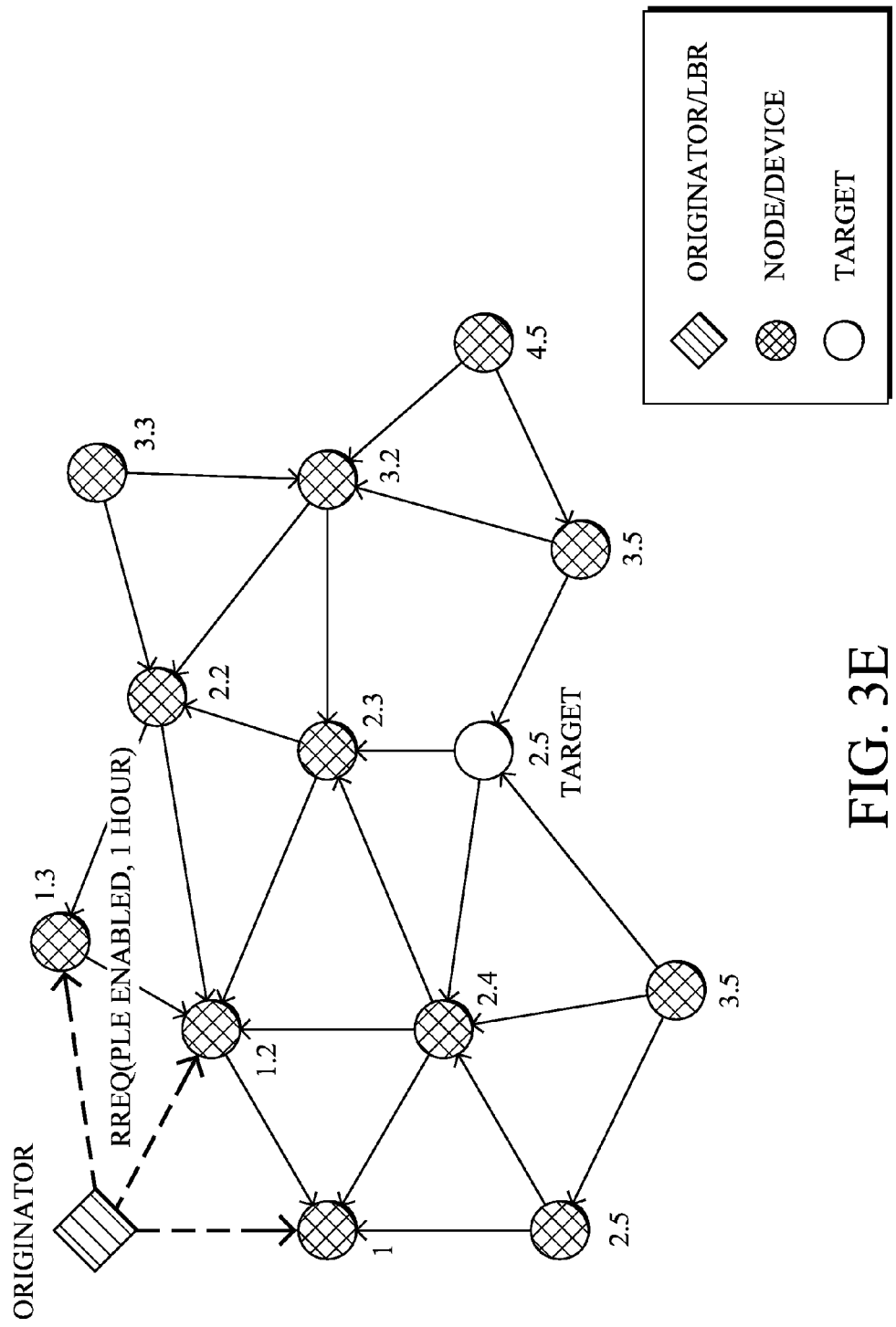
Figure 3F:
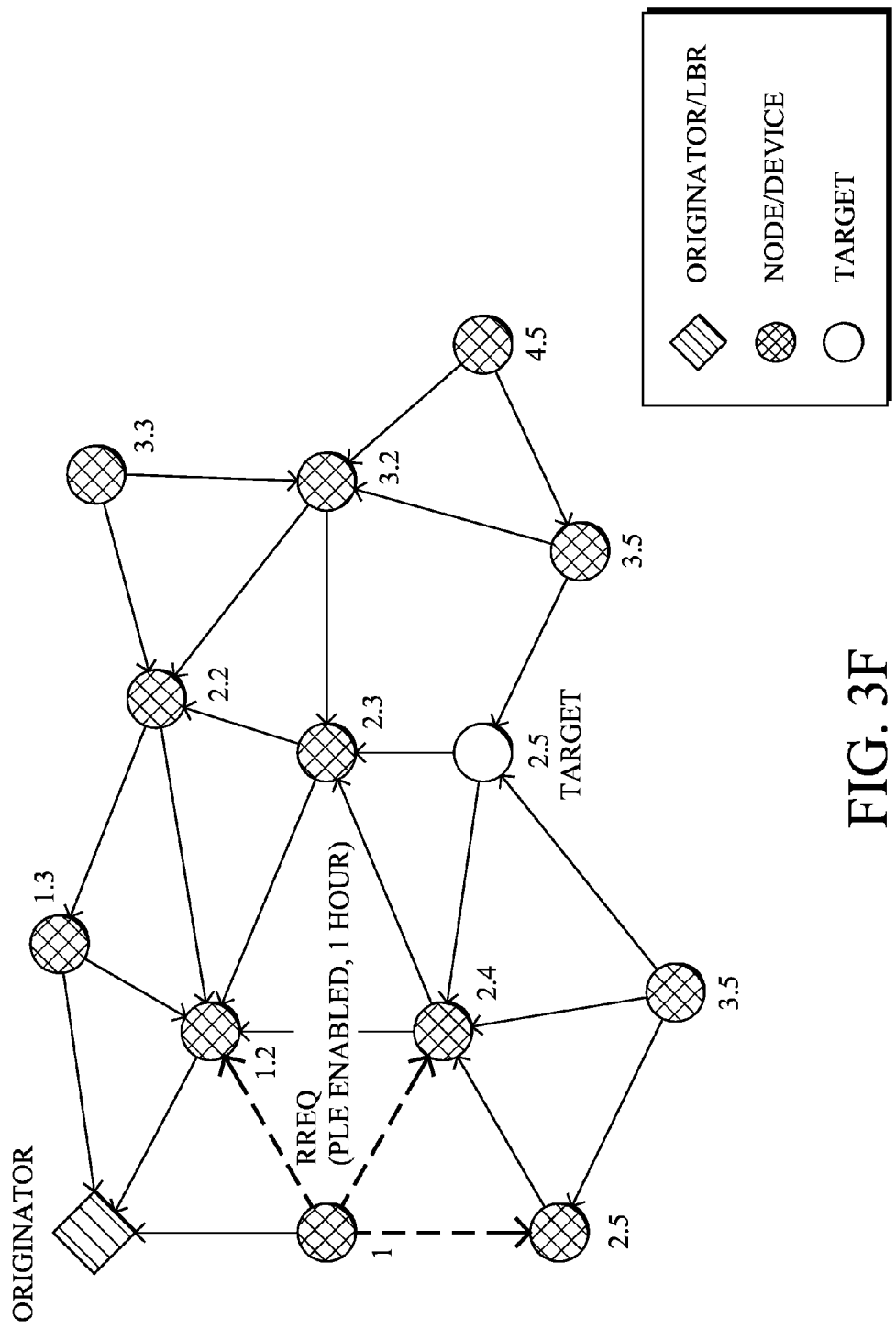

With reference to FIGS. 3E-3F, subsequent RREQs may be sent to establish routes to a new Target, in which case intermediate devices may use the link quality estimates that were proactively maintained. Proactively maintaining link quality estimates (i) reduces the latency for finding a route and (ii) increases the robustness of link quality estimate since it is made from a number of samples over time. This is in contrast to existing approaches, which do not make any assumption on the location of the Originator, such as:

Proactive methods (e.g. Neighborhood Discovery Protocol (NHDP)), which perform proactive link quality estimates with all 1-hop or 2-hop neighbors, and have an overall cost that grows with the square of device/node density in the network; and Reactive methods (e.g. Neighbor Discovery Protocol (NDP)), which cause additional latency in the network.

Figure 4:
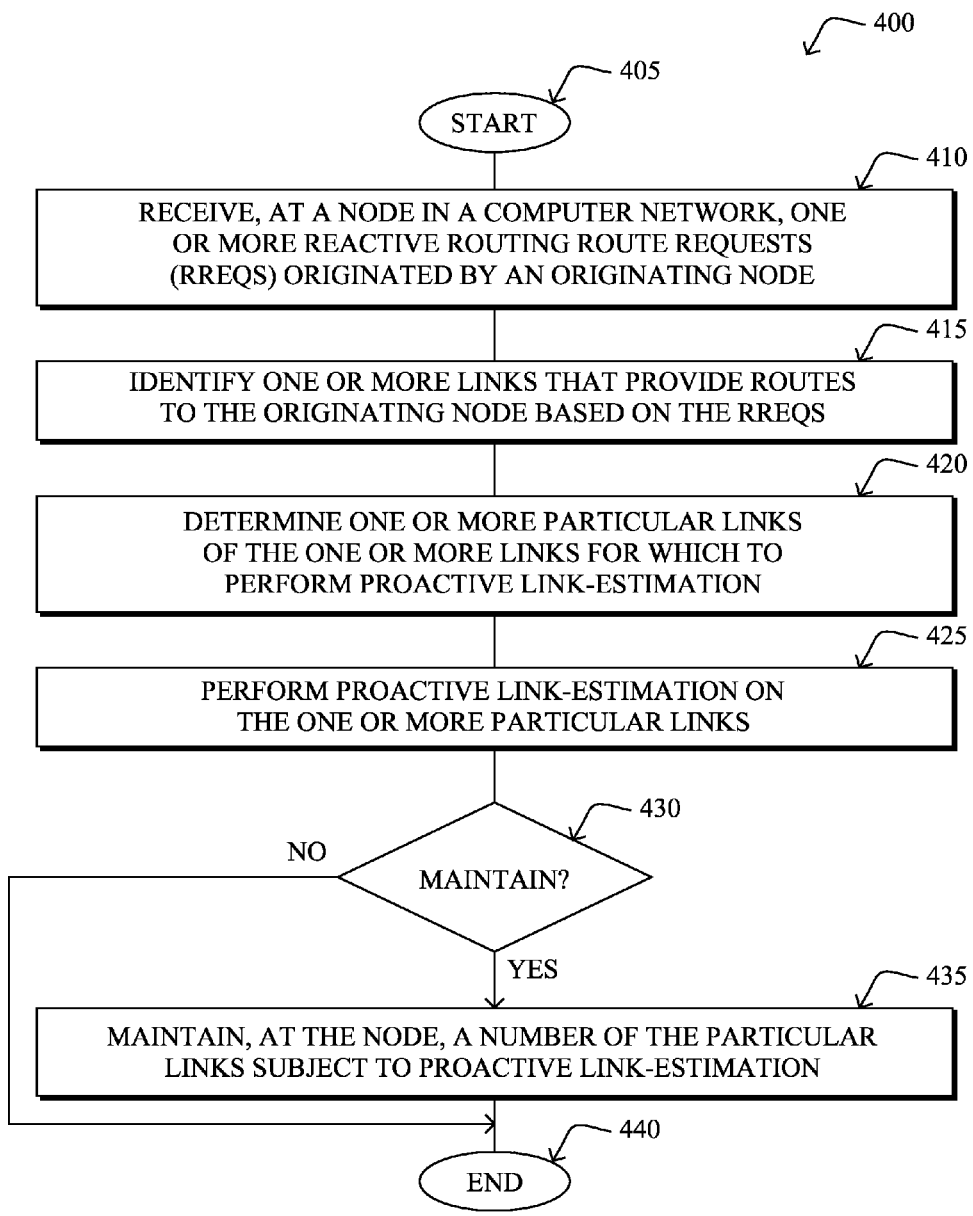
FIG. 4 illustrates an example simplified procedure for performing proactive link-estimation with a reactive routing protocol.

FIG. 4 illustrates an example simplified procedure for proactive link-estimation in a reactive routing network in accordance with one or more embodiments described herein. The procedure 400 may start at step 405, and continue to step 410 where, as described above, a node in a computer network may receive one or more reactive routing route requests (RREQs) originated by an originating node. As shown in step 415, the node may then identify one or more links that provide routes to the originating node based on the RREQs. The node may then determine, in step 420, one or more particular links within the one or more links for which to perform proactive link-estimation. As shown in step 425, once chosen, the node may then perform proactive link-estimation on the one or more particular links. Optionally, the node may also maintain a number of the particular links that were subject to proactive link-estimation for a period of time. For example, as shown in step 430, the node may determine whether or not to maintain the link, or links, that were subject to the proactive link-estimation process. If the node determines to maintain the link, or links, in step 430, then in step 435, the node maintains the link, or links, accordingly. Conversely, if the node determines not to maintain the link, or links, in step 430, then the procedure 400 may illustratively end in step 440, though notably with the option to return to any appropriate step described above based on the dynamicity of the proactive link-estimation process as detailed within the disclosure above.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for proactive link-estimation in a reactive routing communication network. In particular, the techniques herein allow devices/nodes to selectively choose links on which to perform proactive link-estimation based on the RREQ and information contained therein. In doing so, subsequent route-discoveries occur with much lower latency since link quality estimates are readily available (e.g., because they have already been maintained), and ultimately produce more robust routes since the link qualities used to compute path costs are computed over longer periods of time. Furthermore, the techniques herein minimize the memory and control overhead of proactively maintaining link quality estimates.

While there have been shown and described illustrative embodiments of techniques that provide proactive link-estimation for use with reactive routing protocols in communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly. In addition, while the description above illustratively uses a PLE flag to specifically request proactive link-estimation, the techniques herein may also allow for self-activation by network devices, in which the nodes/devices of the network may determine whether to apply proactive link-estimation at certain times and/or at all times, without having been specifically requested by the originator of an RREQ.

The foregoing description has been directed to specific embodiments. However, it will be apparent that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a node in a computer network, one or more reactive routing route requests (RREQs) originated by an originating node;
   identifying, by the node, one or more links that provide routes to the originating node based on the one or more reactive routing requests (RREQs);

determining, by the node, one or more particular links of
the one or more links for which to perform proactive
link-estimation; and performing proactive link-estimation on the one or more
particular links, wherein the proactive link estimation is
limited to the determined one or more particular links,
and the proactive link-estimation is performed on those
one or more particular links for a limited set period of
time after the one or more reactive routing request
(RREQs) have been received.

2. The method as in claim 1, wherein determining is based on a proactive link-estimation field in the one or more reactive routing requests (RREQs).

3. The method as in claim 2, wherein the proactive link-estimation field is based on historical data hosted by an originating node that originated the response request, network traffic matrix information, or a policy map.

4. The method as in claim 1, wherein the limited set period of time is a pre-determined period of time after the one or more reactive routing requests (RREQs) have been received.

5. The method as in claim 1, wherein the limited set period of time is determined by the one or more reactive routing requests (RREQs).

6. The method as in claim 1, wherein the limited set period of time is determined based on observed network traffic.

7. The method as in claim 1, further comprising:
maintaining, at the node, a number of the particular links subject to proactive link-estimation.

8. The method as in claim 7, wherein the number of links to be maintained comprises the one or more links with the most favorable path costs.

9. The method as in claim 7, wherein the one or more links to be maintained are dynamically selected based on observed network traffic.

10. The method as in claim 7, wherein the number of links to be maintained is determined by the one or more reactive routing requests (RREQs).

11. An apparatus, comprising:
one or more network interfaces to communicate as a node in a communication network;
a processor coupled to the network interfaces and adapted to execute one or more processes; and
a memory configured to store a process executable by the processor, the process when executed operable to:
receive one or more reactive routing route requests (RREQs) originated by an originating node;
identify one or more links that provide routes to the originating node based on the one or more reactive routing requests (RREQs);
determine one or more particular links of the one or more links for which to perform proactive link-estimation; and
perform proactive link-estimation on the one or more particular links, wherein the proactive link estimation is limited to the determined one or more particular links, and the proactive link-estimation is performed on those one or more particular links for a limited set period of time after the one or more reactive routing request (RREQs) have been received.

12. The apparatus as in claim 11, wherein the process is configured to determine one or more particular links of the one or more links for which to perform proactive link-estimation based on a proactive link-estimation field in the one or more reactive routing requests (RREQs).

13. The apparatus as in claim 11, wherein the limited set period of time is a pre-determined period of time after the one or more reactive routing requests (RREQs) has been received.

14. The apparatus as in claim 11, wherein the limited set period of time is determined by the one or more reactive routing requests (RREQs).

15. The apparatus as in claim 11, wherein the process when executed is further operable to:
maintain a number of the particular links subject to proactive link-estimation.

16. The apparatus as in claim 15, wherein the number of links to be maintained comprises the one or more links with the most favorable path costs.

17. The apparatus as in claim 15, wherein the number of links to be maintained is determined by the one or more reactive routing requests (RREQs).

18. A tangible, non-transitory, computer-readable media having software encoded thereon, the software when executed by a processor operable to:
receive one or more reactive routing route requests (RREQs) originated by an originating node;
identify one or more links that provide routes to the originating node based on the one or more reactive routing requests (RREQs);
determine one or more particular links of the one or more links for which to perform proactive link-estimation; and
perform proactive link-estimation on the one or more particular links, wherein the proactive link estimation is limited to the determined one or more particular links, and the proactive link-estimation is performed on those one or more particular links for a limited set period of time after the one or more reactive routing request (RREQs) have been received.

\* \* \* \* \*

UNITED STATES PATENT AND TRADEMARK OFFICE
CERTIFICATE OF CORRECTION

PATENT NO. : 9,119,130 B2  
APPLICATION NO. : 13/524861  
DATED : August 25, 2015  
INVENTOR(S) : Hui et al.

Page 1 of 1

It is certified that error appears in the above-identified patent and that said Letters Patent is hereby corrected as shown below:

In the Specification

In column 1, line 27, please amend as follows:
   component of the [[is]] overall networking solution. Two funda- In column 1, line 61, please amend as follows:
   reactive routing route requests (RREQs) originated by [[is]] an In column 4, line 26, please amend as follows:
   works (LLNs), which [[is]] are a class of networks in which both.

In column 5, line 1, please amend as follows:
   (routes are computed on-the-fly and on-demand by a node [[is]]

In column 5, line 41, please amend as follows:
   Collection Engine [[is]] reads each meter one-by-one in round- In column 6, line 14, please amend as follows:
   where it is used to [[is]] compute path costs and perform rate In column 7, line 29, please amend as follows:
   differs [[is]] from existing reactive routing protocols, such as Signed and Sealed this  
Nineteenth Day of January, 2016

Michelle K. Lee  
*Director of the United States Patent and Trademark Office*